United States Patent
Rozenboim

(10) Patent No.: US 8,325,059 B2
(45) Date of Patent: Dec. 4, 2012

(54) METHOD AND SYSTEM FOR COST-EFFECTIVE POWER LINE COMMUNICATIONS FOR SENSOR DATA COLLECTION

(75) Inventor: Leonid Rozenboim, Los Gatos, CA (US)

(73) Assignee: Tigo Energy, Inc., Los Gatos, CA (US)

( * ) Notice: Subject to any disclaimer, the term of this patent is extended or adjusted under 35 U.S.C. 154(b) by 452 days.

(21) Appl. No.: 12/467,116

(22) Filed: May 15, 2009
(Under 37 CFR 1.47)

(65) Prior Publication Data
US 2010/0117858 A1    May 13, 2010

Related U.S. Application Data

(60) Provisional application No. 61/198,991, filed on Nov. 12, 2008, provisional application No. 61/198,989, filed on Nov. 12, 2008.

(51) Int. Cl.
*G08C 19/22* (2006.01)
*H04Q 9/00* (2006.01)
*H01L 31/042* (2006.01)

(52) U.S. Cl. .............. 340/870.07; 136/243; 136/244; 136/251

(58) Field of Classification Search .......... 340/870.07; 320/101; 136/243–244, 251
See application file for complete search history.

(56) References Cited

U.S. PATENT DOCUMENTS

| | | |
|---|---|---|
| 4,526,553 A | 7/1985 | Guerrero |
| 5,235,266 A | 8/1993 | Schaffrin |
| 5,268,832 A | 12/1993 | Kandatsu |
| 5,604,430 A | 2/1997 | Decker et al. |
| 5,923,158 A | 7/1999 | Kurokami et al. |
| 6,081,104 A | 6/2000 | Kern |
| 6,262,558 B1 * | 7/2001 | Weinberg ............ 320/101 |
| 6,275,016 B1 | 8/2001 | Ivanov |
| 6,433,522 B1 | 8/2002 | Siri |
| 6,448,489 B2 | 9/2002 | Kimura et al. |
| 6,650,031 B1 | 11/2003 | Goldack |
| 6,844,739 B2 | 1/2005 | Kasai et al. |
| 6,894,911 B2 | 5/2005 | Telefus et al. |
| 6,984,970 B2 | 1/2006 | Capel |
| 7,061,214 B2 | 6/2006 | Mayega |
| 7,248,946 B2 | 7/2007 | Bashaw et al. |
| 7,256,566 B2 | 8/2007 | Bhavaraju et al. |
| 7,276,886 B2 | 10/2007 | Kinder |

(Continued)

FOREIGN PATENT DOCUMENTS

AU  2005262278  7/2005

(Continued)

OTHER PUBLICATIONS

ABB France, "AC500—Your PLC for Solar Systems: Change for More Efficient Energy," product brochure, Jul. 2009.

(Continued)

*Primary Examiner* — Dharti Patel
(74) *Attorney, Agent, or Firm* — Greenberg Traurig, LLP

(57) ABSTRACT

A method and system includes a solar panel. A power bus is coupled to the solar panel. The power bus supports transmission of AC communication signals. A slave node, coupled to the power bus, transmits information regarding solar panel performance. A master node, remotely coupled to the slave node over the power bus, receives the information regarding solar panel performance from the slave node.

19 Claims, 12 Drawing Sheets

U.S. PATENT DOCUMENTS

| | | |
|---|---|---|
| 7,356,048 B1 | 4/2008 | Rezvani |
| 7,518,346 B2 | 4/2009 | Prexl |
| 7,595,616 B2 | 9/2009 | Prexl |
| 7,605,498 B2 | 10/2009 | Ledenev et al. |
| 7,719,140 B2 | 5/2010 | Ledenev et al. |
| 7,791,215 B2 | 9/2010 | Barthold et al. |
| 7,797,367 B1* | 9/2010 | Gelvin et al. ............ 709/200 |
| 2002/0002040 A1 | 1/2002 | Kline et al. |
| 2004/0258141 A1 | 12/2004 | Tustison et al. |
| 2005/0057214 A1 | 3/2005 | Matan |
| 2005/0057215 A1 | 3/2005 | Matan |
| 2006/0001406 A1 | 1/2006 | Matan |
| 2006/0005125 A1 | 1/2006 | Reponen |
| 2006/0162772 A1* | 7/2006 | Presher et al. ............ 136/290 |
| 2006/0174939 A1 | 8/2006 | Matan |
| 2006/0185727 A1 | 8/2006 | Matan |
| 2007/0152628 A1 | 7/2007 | Lee |
| 2007/0273351 A1 | 11/2007 | Matan |
| 2008/0084937 A1 | 4/2008 | Barthold et al. |
| 2008/0106241 A1 | 5/2008 | Deaver et al. |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0147335 A1 | 6/2008 | Adest et al. |
| 2008/0179949 A1 | 7/2008 | Besser et al. |
| 2008/0191560 A1 | 8/2008 | Besser et al. |
| 2008/0191675 A1 | 8/2008 | Besser et al. |
| 2008/0303503 A1 | 12/2008 | Wolfs |
| 2009/0000654 A1 | 1/2009 | Rotzoll et al. |
| 2009/0160258 A1 | 6/2009 | Allen et al. |
| 2009/0284240 A1 | 11/2009 | Zhang et al. |
| 2010/0118985 A1 | 5/2010 | Rozenboim |

FOREIGN PATENT DOCUMENTS

| | | |
|---|---|---|
| DE | 4232356 | 3/1994 |
| DE | 19961705 | 7/2001 |
| EP | 1388774 | 2/2004 |
| ES | 2249147 | 3/2006 |
| WO | 03012569 | 2/2003 |

OTHER PUBLICATIONS

Danfoss Solar Inverters A/S, "Concept Paper: String Inverters for PV Power Plants," May 2009.

Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.

Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.

Palma, L. et al., "A Modular Fuel Cell, Modular DC-DC Converter Concept for High Performance and Enhanced Reliability," 38th IEEE Power Electronics Specialists Conference (PESC'07), pp. 2633-2638, Jun. 17, 2007.

Quaschning, V. et al., "Cost Effectiveness of Shadow Tolerant Photovoltaic Systems," Euronsun 96, pp. 819-824, Sep. 16, 1996.

Storfer, Lior, "Enhancing Cable Modem TCP Performance," Texas Instruments Inc. white paper, Jul. 2003.

Uriarte, S. et al., "Energy Integrated Management System for PV Applications," 20th European Photovoltaic Solar Energy Conference, Jun. 6, 2005.

Walker, G. R. et al., "Cascaded DC-DC Converter Connection of Photovoltaic Modules," 33rd IEEE Power Electronics Specialists Conference (PESC'02), vol. 1, pp. 24-29, 2002.

Wikimedia Foundation, Inc., "Power Line Communication," located at http://en.wikipedia.org/wiki/Power_line_communication, Mar. 7, 2010.

Alonso, R. et al., "A New Distributed Converter Interface for PV Panels," 20th European Photovoltaic Solar Energy Conference, Barcelona, Spain, pp. 2288-2291, Jun. 6-10, 2005.

Alonso, R. et al., "Experimental Results of Intelligent PV Module for Grid-Connected PV Systems," 21st European Photovoltaic Solar Energy Conference, Dresden, Germany, pp. 2297-2300, Sep. 4-8, 2006.

Enslin, Johan H.R., et al., "Integrated Photovoltaic Maximum Power Point Tracking Converter," IEEE Transactions on Industrial Electronices, vol. 44, No. 6, pp. 769-773, Dec. 1997.

Roman, Eduardo, et al., "Intelligent PV Module for Grid-Connectred PV Systems," IEEE Transactions on Industrial Electronics, vol. 53, No. 4, pp. 1066-1073, Aug. 2006.

Walker, Jeffrey R. et al., "Cascaded DC-DC Converter Connection of Photovoltaic Modules," IEEE Transactions on Power Electronics, vol. 19, No. 4, pp. 1130-1139, Jul. 2004.

Basso, Tim, "IEEE Standard for Interrconnecting Distributed Resources With the Electric Power System," IEEE PES Meeting, Jun. 9, 2004.

Boostbuck.com, "The Four Boostbuck Topologies," located at http://www.boostbuck.com/TheFourTopologies.html, 2003.

Gautam, Nalin K. et al., "An Efficient Algorithm to Simulate the Electrical Performance of Solar Photovoltaic Arrays," Energy, vol. 27, No. 4, pp. 347-361, 2002.

International Patent Application PCT/US08/75127, International Search Report and Written Opinion (mailed Apr. 28, 2009).

Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.

Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.

\* cited by examiner

METHOD AND SYSTEM FOR COST-EFFECTIVE POWER LINE COMMUNICATIONS FOR SENSOR DATA COLLECTION

RELATED APPLICATIONS

The present application claims priority to U.S. Provisional Application Ser. App. No. 61/198,991, filed Nov. 12, 2008, entitled "Current-Mode Power Line Communications" and U.S. Provisional Application Ser. App. No. 61/198,989, filed Nov. 12, 2008, entitled "Method and System for Cost-Effective Power Line Communications for Sensor Data Collection," both of which are assigned to the assignee hereof and hereby expressly incorporated by reference.

FIELD OF THE INVENTION

The present invention relates generally to the field of communications and, more particularly, to power line communications.

BACKGROUND

Many of the issues involved in sending communication signals over DC power lines are similar to sending such signals over the AC power grid. For example, the properties of the transmission medium can vary greatly. As another example, the amount and nature of noise sources are very difficult to predict.

However, there are some important differences too. While on the AC power grid, loads are mostly of an inductive nature, and some loads may be resistive and a few subtly capacitive. On a DC power bus, virtually all loads and sources are capacitive in nature. Another key difference lies in the use of transformers to convert between different voltage levels on an AC power grid that cannot be similarly employed on a DC bus. Hence, a majority of sources and loads on a DC bus employ electronic DC-DC converters, which are very strong noise emitters.

There are many challenges to communicating digital data quickly and reliably over a set of wires intended to conduct electrical energy. For a variety of reasons, the signal carrier frequency should not exceed 500 kHz. One reason is to avoid antenna effects, and avoid excessive signal attenuation and unintentional electromagnetic radiation. Power line carrier frequency is typically between 90 kHz and 490 kHz for a small power line network as might be used for a residence. Larger commercial power line installations must further limit the maximum carrier frequency so that the effective length of the wires does not exceed ⅛ of the carrier wavelength.

Low carrier frequency, in turn, means that the rate of signal that can be modulated on such a carrier is also very low to maintain a certain payload to carrier ratio. The signal rate that can be carried by a frequency is also limited by severe noise and attenuation typical of power lines because the slower the signal rate, the more energy is carried by a single symbol (bit). With more energy in a bit, the less likely it will be corrupted in transmission.

There are several types of products on the market at this time to address the needs of power line communications. For example, broadband communication products deliver local area network performance but often can not handle more than just a handful of nodes on the network. Broadband communication products also often lack the robustness and reliability that is needed for a sensor network.

SUMMARY

In one of many embodiments of the present invention, a method and system includes a solar panel. A power bus is coupled to the solar panel. The power bus supports transmission of AC communication signals. A slave node, coupled to the power bus, transmits information regarding solar panel performance. A master node, remotely coupled to the slave node over the power bus, receives the information regarding solar panel performance from the slave node.

In one of many embodiments of the present invention, the slave node includes a first controller.

In one of many embodiments of the present invention, the master node includes a second controller.

In one of many embodiments of the present invention, the information regarding solar panel performance is transmitted using a spread spectrum communications technique.

In one of many embodiments of the present invention, the master node transmits information regarding configuration to the slave node.

In one of many embodiments of the present invention, the information regarding configuration includes at least one of identification information, channel information, and transmission timing information.

In one of many embodiments of the present invention, the slave node includes a single channel modem.

In one of many embodiments of the present invention, the slave node includes a single channel modem employing single carrier FSK.

In one of many embodiments of the present invention, the master node includes a plurality of single channel modems.

In one of many embodiments of the present invention, the master node includes a digital signal processor (DSP).

In one of many embodiments of the present invention, the information regarding solar panel performance includes at least one of electrical power consumption, electrical power generation, power quality, and environmental parameters.

In one of many embodiments of the present invention, the slave node operates in a configuration mode and a data collection mode.

In one of many embodiments of the present invention, the slave node is a sensor having an LED to visibly indicate operation in a configuration mode or a data collection mode.

In one of many embodiments of the present invention, a backup master node is further provided.

Other embodiments and features of the present invention will be apparent from the accompanying drawings and from the detailed description which follows.

BRIEF DESCRIPTION OF THE DRAWINGS

The present disclosure is illustrated by way of example and not limitation in the figures of the accompanying drawings in which like references indicate similar elements.

DESCRIPTION OF THE EMBODIMENT

Figure 1:
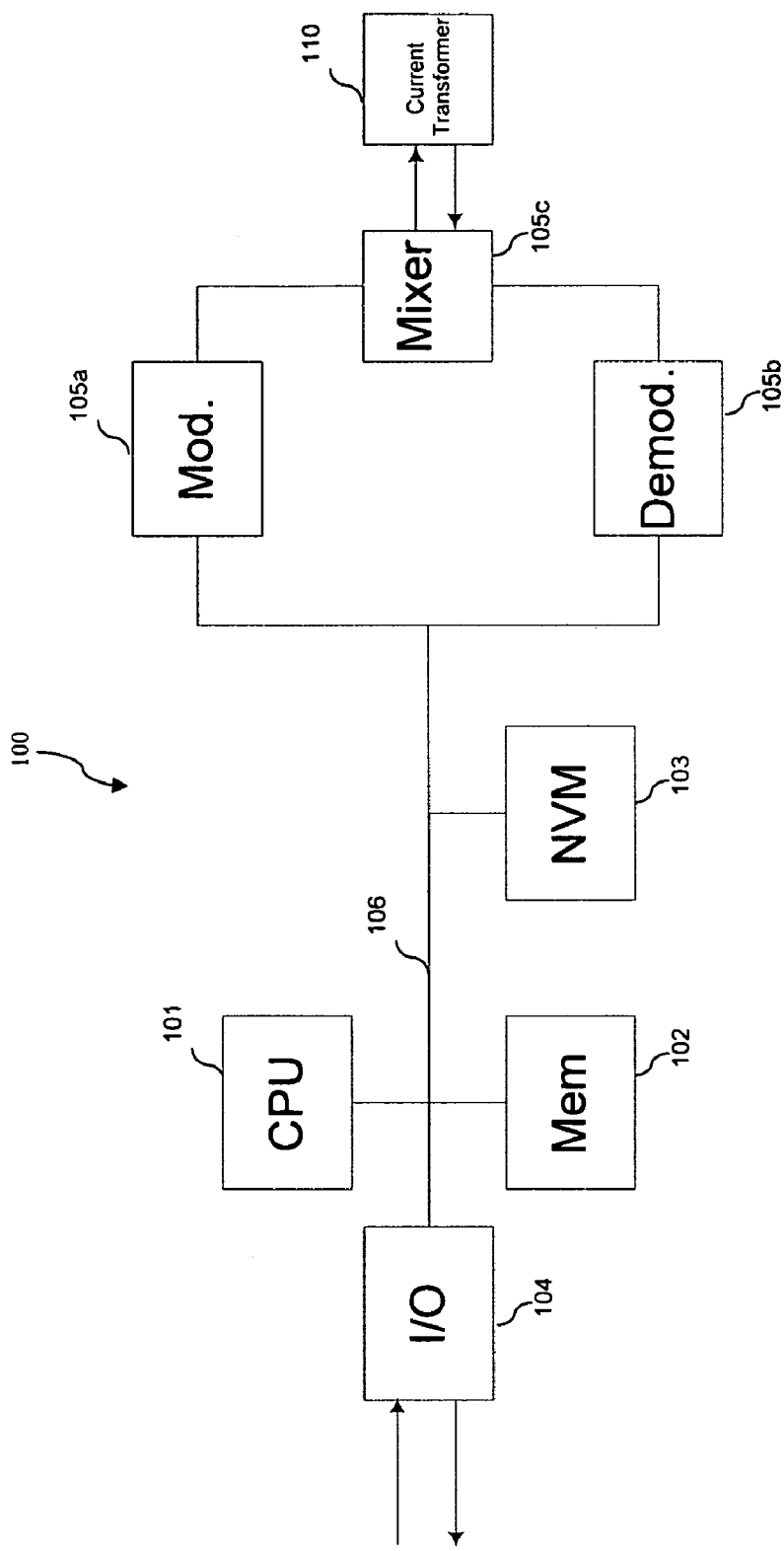
FIG. 1 illustrates an exemplary adapter for coupling with a current transformer in a communication system in accordance with one embodiment of the present invention.

In the following description, for purposes of explanation, numerous specific details are set forth in order to provide a thorough understanding of the description. It will be apparent, however, to one skilled in the art that embodiments of the disclosure can be practiced without these specific details. In some instances, structures and devices are shown in block diagram form in order to avoid obscuring the description. In other instances, functional block diagrams are shown to represent data and logic flows.

Reference in this specification to "one embodiment," "an embodiment," "other embodiments" or the like means that a particular feature, structure, or characteristic described in connection with the embodiment is included in at least one embodiment of the disclosure. The appearances of, for example, the phrase "in one embodiment" in various places in the specification are not necessarily all referring to the same embodiment, nor are separate or alternative embodiments mutually exclusive of other embodiments.

Moreover, whether or not there is express reference to an "embodiment" or the like, various features are described which may be exhibited by some embodiments and not by others. Similarly, various requirements are described which may be requirements for some embodiments but not other embodiments.

The methods and systems of the present invention relate to transmission of AC communications signals over DC power lines. The method and system of the present invention is an advancement over conventional practices of providing communications over AC power lines, both at the residential level for home automation as well as at the distribution level by a utility company. The addition of telecommunications signals over DC power lines in accordance with the method and system of the present invention has many applications, including narrow-band audio distribution, automatic meter reading, system diagnostics, and more.

An exemplary embodiment of the present invention is designed for the use of electrical power wires of a solar panel installation for the purpose of monitoring the performance of the individual solar panels and collection of their performance data at a centralized station. However, the present invention can have a variety of additional applications, including but not limited to any direct current power distribution system. In one embodiment, the present invention can be used in applications wherein the communication frequencies used do not create an antenna effect, i.e., ⅛ (one-eighth) wavelength of the communications signal does not exceed the dimensions of the power distribution lines.

As stated above, there are important distinctions between the transmission of communication signals over DC power lines versus the AC power grid. While on the AC power grid, most loads are inductive in nature. Other loads may be resistive and while still others may be capacitive. On a DC power bus, almost all loads and sources are capacitive in nature. Another key difference lies in the use of transformers to convert between different voltage levels on an AC power grid that cannot be similarly employed on a DC bus. Hence a majority of sources and loads on a DC bus employ electronic DC-DC converters, which characteristically can be very strong noise emitters.

In certain circumstances, the capacitive nature of DC loads and sources can be mitigated to some degree using series inductive filters. Such use of inductors as filters would attenuate AC noise as well, in turn allowing the conventional use of voltage mode AC communication signals over a fairly known impedance range for communications. However, these inductors may be physically large due to the need for them to sustain high currents while being connected in series to the DC power bus. The relative high expense of such a technique can rival or far exceed the costs of running separate, dedicated wires for communications, another undesirable technique.

Instead of "fighting" or otherwise attempting to remediate the capacitive nature of the DC bus and hence its related tendency to exhibit very low impedance to AC communications signals, the present invention innovatively leverages those qualities of the DC bus to advantage. In this regard, it is assumed that all loads are capacitive in nature and thus the transmission line impedance is very low, namely lower than 2Ω. Thus, the communications signal is carried over the DC bus in the form of AC current. In this manner, the loads appear as "short circuits" to the AC communications signal, and do not attenuate the signal significantly when connected in series.

Appropriate measures can be employed to achieve low impedance of loads and sources. Whenever a load or source has impedance that is too high, the problem can be mitigated by connecting a capacitor in parallel to the load or source. Also, if a load generates an undue amount of noise, a capacitor added directly on the terminals connecting that load to the DC bus can dissipate most of the noise. In certain extreme cases, a ferrite filter may be used on one of the wires. The addition of a ferrite filter in this manner can avoid the need for a capacitor that is excessively large.

It will be appreciated that care should be exercised to avoid several DC loads or sources being connected in parallel too closely to one another. Such a connection would undesirably create natural inductance from the loads. The resulting inductance would attenuate the AC signal to an undue degree.

In accordance with one embodiment of the present invention, a current transformer is employed to convert a current mode AC signal, which carries communications signals, to and from a conventional voltage mode. The use of a current transformer allows the communications signal to be generated and received using existing electronic components. The current transformer, a low cost device often used to measure AC current on power lines, has a wider bandwidth so that the current transformer itself does not dissipate the AC communications signal.

In one embodiment of the present invention, the current transformer includes a Rogowski coil. The Rogowski coil is a toroidal coil having an air core. The Rogowski coil serves as a secondary winding for the current transformer, with the primary winding being the power wire threaded through the center of the toroid. The current transformer serves to match transceiver impedance with transmission line impedance. The transceiver impedance is typically in the 50 to 100 ohm range, while the transmission line impedance is in the 0.25 to 0.75 ohm range. In one embodiment, the current transformer has a winding ratio in the range of 1:50 to 1:200, where the high-current power wire serves as the single winding of the primary coil of the transformer.

FIG. 1 shows an overview of an exemplary adapter 100 that can drive or listen to Rogowskis coil to form a communication system in accordance with one embodiment of the present invention. The adapter 100 includes CPU 101, random access memory (MEM) 102, non volatile memory (NVM) 103, input/output (I/O) system 104, modulator 105a, demodulator 105b, mixer 105c, and bus 106. A coupling current transformer 110, which is described in more detail below, is coupled to the adapter 100 and to a DC power bus, as discussed in more detail below. In one embodiment, an embedded processor can be used to combine many elements of the adapter 100. The CPU 101 can be a digital signal processor (DSP), or both a CPU and DSP. The CPU 101 is connected to the bus 106, which can contain a power distribution to supply power to, for example, the non volatile memory (NVM) 103, random access memory (RAM) MEM 102, and the input/output (I/O) system 104. The bus 106 communicates with the mixer 105c through the modulator 105a and the demodulator 105b. In one embodiment, the mixer 105c can be a multiplexer or two band pass filters. Together, the modulator 105a and demodulator 105b can constitute a modem.

In one embodiment, the modulator 105a and the demodulator 105b can include analog components, with the rest of the modem implemented in software and stored together with other programs in the non volatile memory (NVM) 103. In one embodiment, the input/output (I/O) system 104 can connect directly to sensors. In one embodiment, control functions may also reside in non volatile memory (NVM) 103 or inside the CPU 101 in the form of analog-to-digital converters to, for example, measure the photovoltaic cell voltage, current, temperature, etc. In one embodiment, the input/output (I/O) system 104 may be used to communicate with, for example, other controllers. The CPU 101, together with the random access memory (RAM) MEM 102 and the non volatile memory (NVM) 103, also can concurrently control a voltage or current conversion to optimize performance of solar panels.

Figure 2:
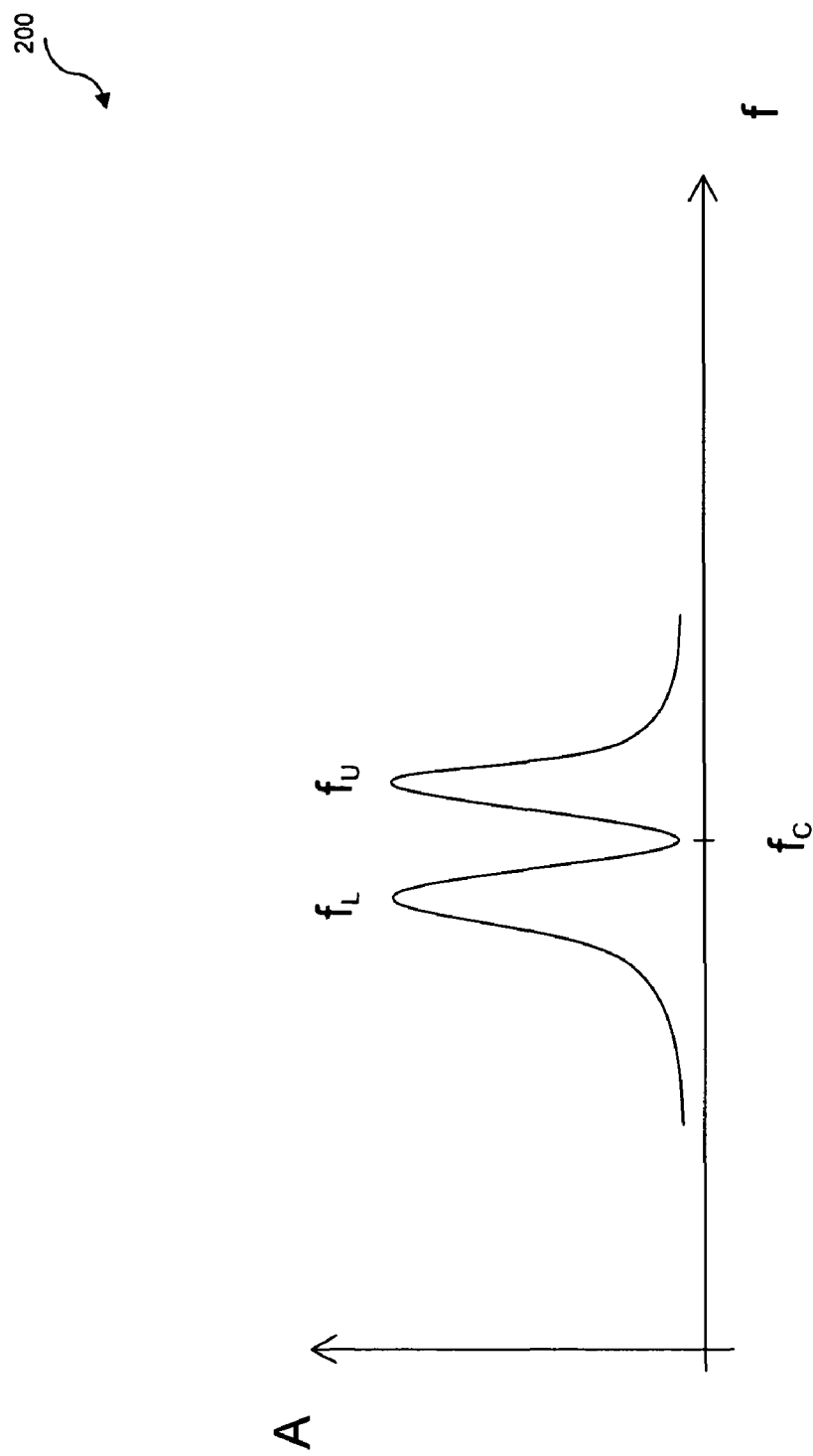
FIG. 2 illustrates an exemplary hull curve of a frequency modulation (FM) communications carrier in accordance with one embodiment of the present invention.

FIG. 2 shows an exemplary hull curve of a frequency modulation (FM) communications signal 200 in accordance with one embodiment of the present invention. The hull curve of the communications signal 200 is shown on a graph where the x-axis represents frequency and the y-axis represents amplitude. The communications signal is carried over the DC power lines with a center frequency $f_c$. $f_l$ and $f_u$ appear as peaks around center frequency $f_c$. In one embodiment, single side band modulation (SSB) or dual side band modulation (DSB) can be used.

Figure 3:
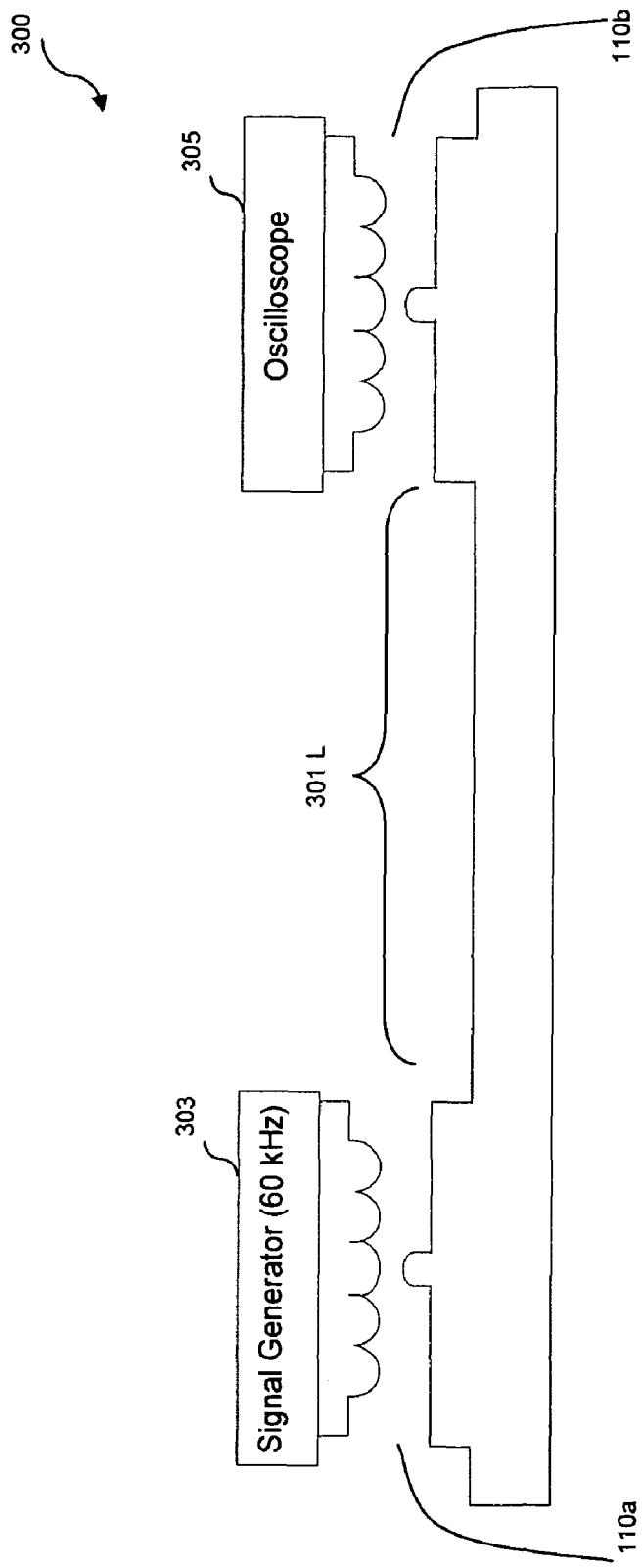
FIG. 3 illustrates an exemplary circuit in accordance with one embodiment of the present invention.

FIG. 3 is a simplified electrical diagram showing an exemplary circuit 300 including a pair of coupling current transformers 110a and 110b. The coupling current transformers are implemented to include Rogowski coils in accordance with one embodiment of the present invention. The coupling current transformers 110a, 110b have equal winding ratios. The current transformers 110a, 110b are connected to one another by a simple current loop wiring 301 having a length L. If the current loop wiring 301 is relatively short, i.e., the length L is approximately a few inches, the impedance of the current loop wiring 301 will approach zero. In this regard, the current transformers 110a, 110b and impedance mismatch between each of their secondary windings and, respectively, an electronic signal source 303 and an electronic signal receiver 305 are the only expected causes of loss in the exemplary circuit 300. In one embodiment, the electronic signal source 303 is a signal generator operating at 60 kHz. In one embodiment, the electronic signal receiver 305 is an oscilloscope.

If the length L of the current loop wiring 301 increases, the impedance of the current loop wiring 301 will increase due to the inherent inductance that is proportional to the length of a straight wire. The increased inductance will attenuate the signal to some degree. However, as will be appreciated by those having ordinary skill in the art, the length L can be limited to approximately one-eighth of the wavelength of the AC communications signal. Such a limitation is intended to avoid antenna effects and associated signal losses and radiation in view of the relative thickness of the power line as a transmission medium for high energy levels.

The impedance generated by the exemplary circuit 300 and thus the resulting attenuation are very small. Empirical results show that a length L equal to approximately 1 foot causes a loss of approximately 25% of the signal strength, which would represent the loss of the current transformers 110a, 110b. A length L equal to approximately 100 feet results in approximately 50% (3 db) attenuation of the signal strength. Neither the power line nor the coupling current transformers are expected to cause any significant attenuation.

Figure 4:
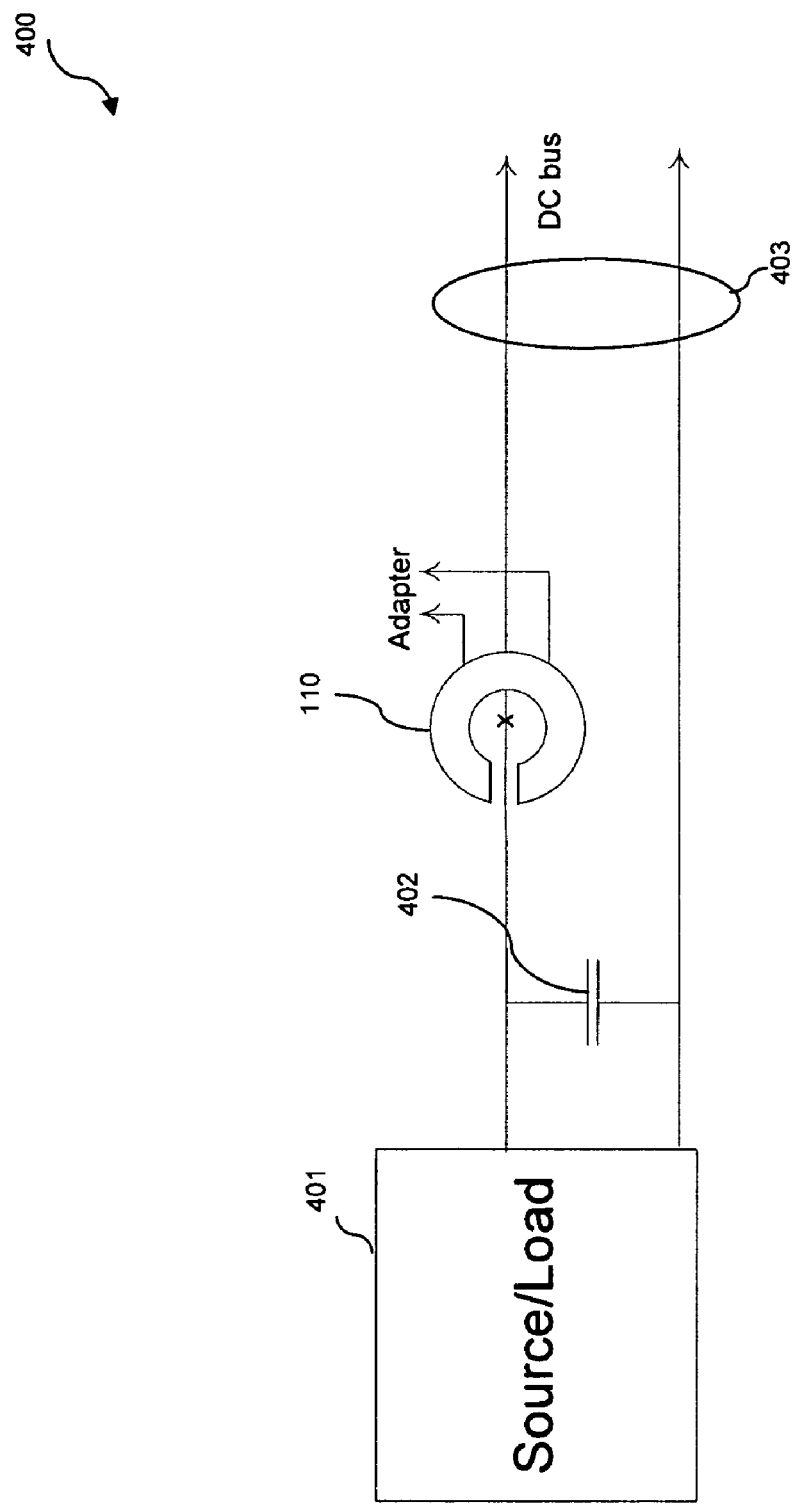
FIG. 4 illustrates an exemplary circuit including a load or source in accordance with one embodiment of the present invention.

FIG. 4 shows exemplary circuit 400 with relatively significant attenuation. The circuit 400 includes a load or source of power 401, a capacitor 402, a DC bus 403, and a coupling current transformer 110. The more significant signal attenuation in circuit 400 is caused by the load or source 401 connected in parallel to the DC bus 403, which serves as a current loop wiring. As discussed above, the desire to reduce the impedance of a current loop wiring, including any load or source, can be achieved by connecting the capacitor 402 in parallel to the load or source 401 as close as possible to its connection to the current loop wiring, i.e., the DC bus 403, but just before the location of the coupling current transformer 110. In this way, for the AC communications signal, the current loop maintains its low impedance. In one embodiment, the current transformer 110 can be connected to an adapter like the kind discussed above in connection with FIG. 1.

The low impedance of the current loop wiring, i.e., the DC bus 403, is fairly immune to electromagnetic fields in the environment surrounding the circuit 400. Any voltage induced onto the wire by external electric or magnetic fields is readily dissipated by the low impedance of the wire. Also, since the wire length is kept relatively short to avoid antenna effects, the impact of external electromagnetic fields is very small.

External electromagnetic fields can induce voltage onto the toroidal secondary windings of the coupling current transformer 110. It is therefore important that the toroidal secondary windings be spread as evenly as possible in accordance with Rogowski coil principles to practically eliminate the influence of external fields on the coupling current transformer 110.

It will be appreciated that the most significant noise sources can be the energy sources and loads present on the DC bus. Such energy sources and loads typically can contain electronic switching voltage converters operating in frequencies that are near the AC communications signal carrier and generate very strong harmonics. For this reason, a bypass parallel capacitor 402 can be connected to such noisy energy sources and loads just behind the coupling transformer. In one embodiment, an inductive filter (not shown) can be connected in series with the parallel capacitor to address energy sources and loads with extremely high noise levels.

Problems may arise with scale. Increased scale would lead to a large number of parallel branches that may cause attenuation to a degree that cannot be addressed by simply adding series inductors to each of the parallel branches. In extreme cases, the cable length may exceed what is possible with a given carrier frequency and result in electromagnetic emissions and increase noise susceptibility.

Figure 5:
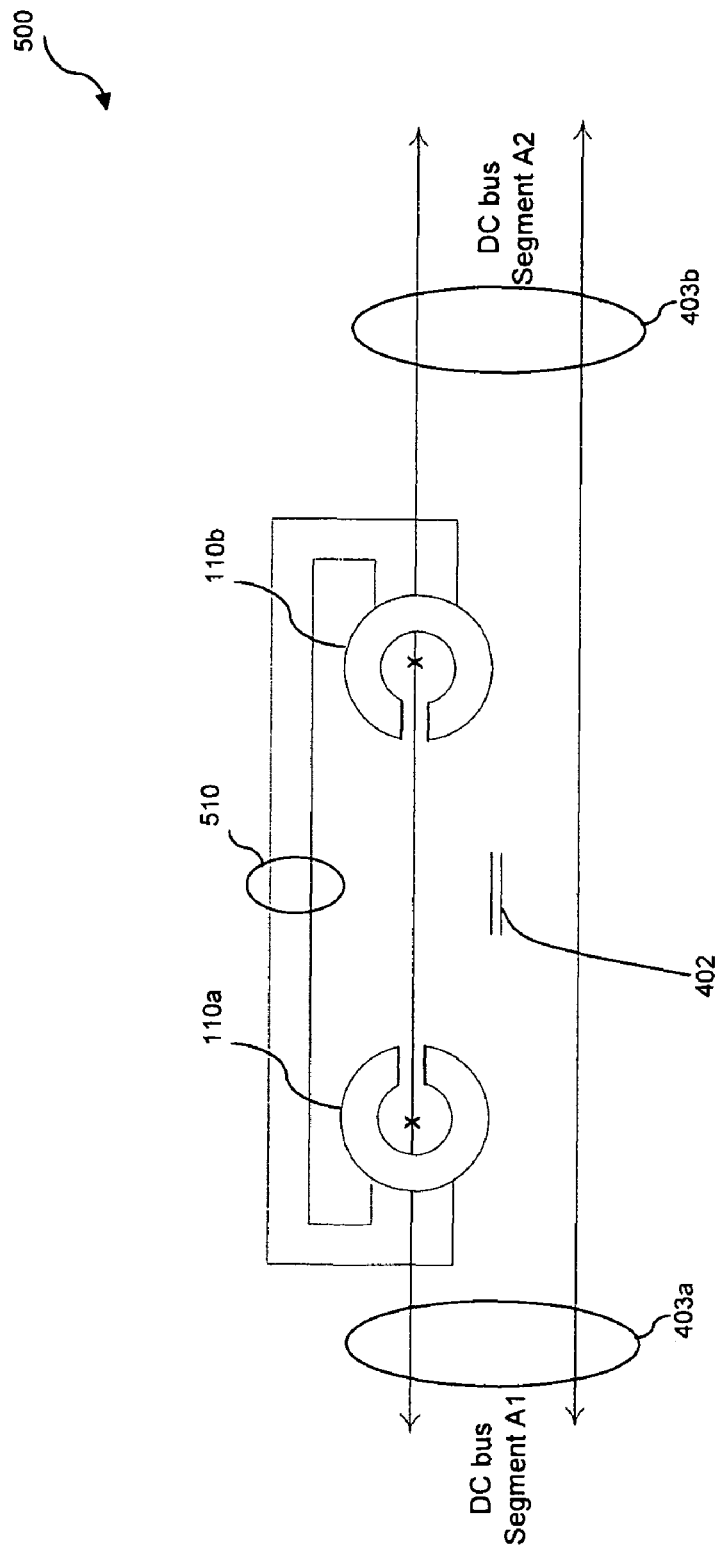
FIG. 5 illustrates an exemplary circuit including a segmented DC bus in accordance with one embodiment of the present invention.

FIG. 5 shows an exemplary circuit 500 that addresses this concern by separating the DC bus 403 into independent segments 403a and 403b. This is accomplished by adding a large parallel, separating capacitor 402 at a predetermined DC bus location. In one embodiment, the impedance of the capacitor 402 is similar to the overall impedance of the DC bus 403, typically less than or equal to 1 ohm. The predetermined DC bus location is based on various considerations with the desire to keep the length of each segment below $\lambda/4$, where $\lambda$ is the wavelength of the lowest carrier frequency used in signaling. Such length prevents the wires from becoming powerfully radiating antennae. Several segments may be required on long buses. A pair of current transformers 110a and 110b are coupled with the DC bus 403 with their secondary windings interconnected on the sides of the separating capacitor 402 via separate link 510. The separate link 510 provides a separate path for the AC communications signal. In one embodiment, one or more active amplifiers (not shown) may be added in the separate link 510 (uni-directional or bi-directional) to amplify weak signals in systems with very long wiring. The amplifiers can be made as clamp-on units that do not require a splicing of cables by having spikes that tap the wires and cores that open for mounting.

Figure 6:
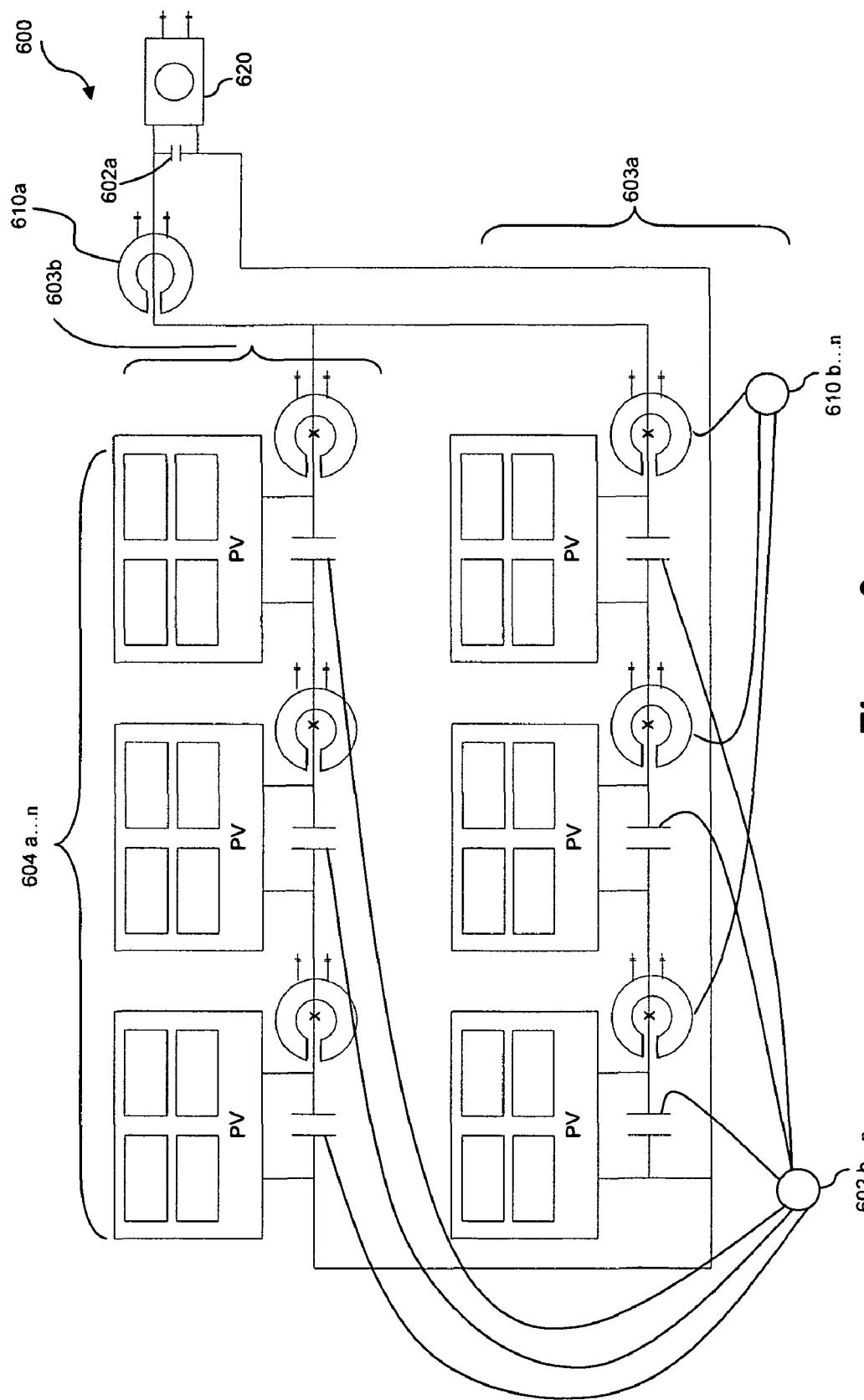
FIG. 6 illustrates a schematic representation of an exemplary energy generation system in accordance with one embodiment of the present invention.

FIG. 6 is a schematic diagram of an energy generation system 600 including an exemplary typical photovoltaic (PV), or solar cell, array 604a-n. Three solar panels in the photovoltaic array 604a-n are shown in a series configuration 603a, and three solar panels in the photovoltaic array 604a-n are shown in a series configuration 603b. The series configuration 603a is connected in parallel with the series configuration 603b. The number of solar panels can of course vary.

The photovoltaic array 604a-n is connected to an inverter 620, which is connected to a capacitor 602a and a current coupling transformer 610a. The capacitor 602a and the current coupling transformer 610a function in the manner described above in connection with, for example, the capacitor 402 and the current coupling transformer 110. The inverter 620 takes power from the DC bus and delivers AC power.

Each of the panels in the photovoltaic array 604a-n is connected to a corresponding capacitor 602b-n and a corresponding current coupling transformer 610b-n. The current coupling transformer 610b-n can be connected to a corresponding adapter (not shown) like the kind discussed above in connection with FIG. 1. Each panel with capacitor 602b-n, current coupling transformer 610b-n, and adapter functions in the manner described above in connection with, for example, the capacitor 402, the current coupling transformer 110, and the adapter 100. Each of the coupling current transformers 610b-n can be connected to an appropriate adapter, sending and receiving voltage mode AC communication signals carrying digital information. As discussed above, the capacitors 602b-n serve as AC bypass capacitors that are located near each panel (or source/load) in the photovoltaic array 604a-n and located just before the current coupling transformer 610b-n. In one embodiment, the capacitors in controllers (or local management units or other DC to DC converters) are large enough to obviate the addition of capacitors 602b-n.

In one embodiment, ferrite filters (not shown) can be coupled, or snapped, onto the DC bus (i.e., power wires) to add inductance. In one embodiment, a ferrite filter can be connected to each series branch of panels in the photovoltaic array 604a-n for impedance control. In one embodiment, a ferrite filter can be connected on the wire between the inverter 620 and its bypass capacitor 602a to even better address the switching noise induced by the inverter 620. In one embodiment, a pair of current transformers with their secondary windings interconnected on the two sides of a separating capacitor via a separate link are coupled to the DC bus at certain intervals, as discussed above in connection with FIG. 5.

Figure 6A:
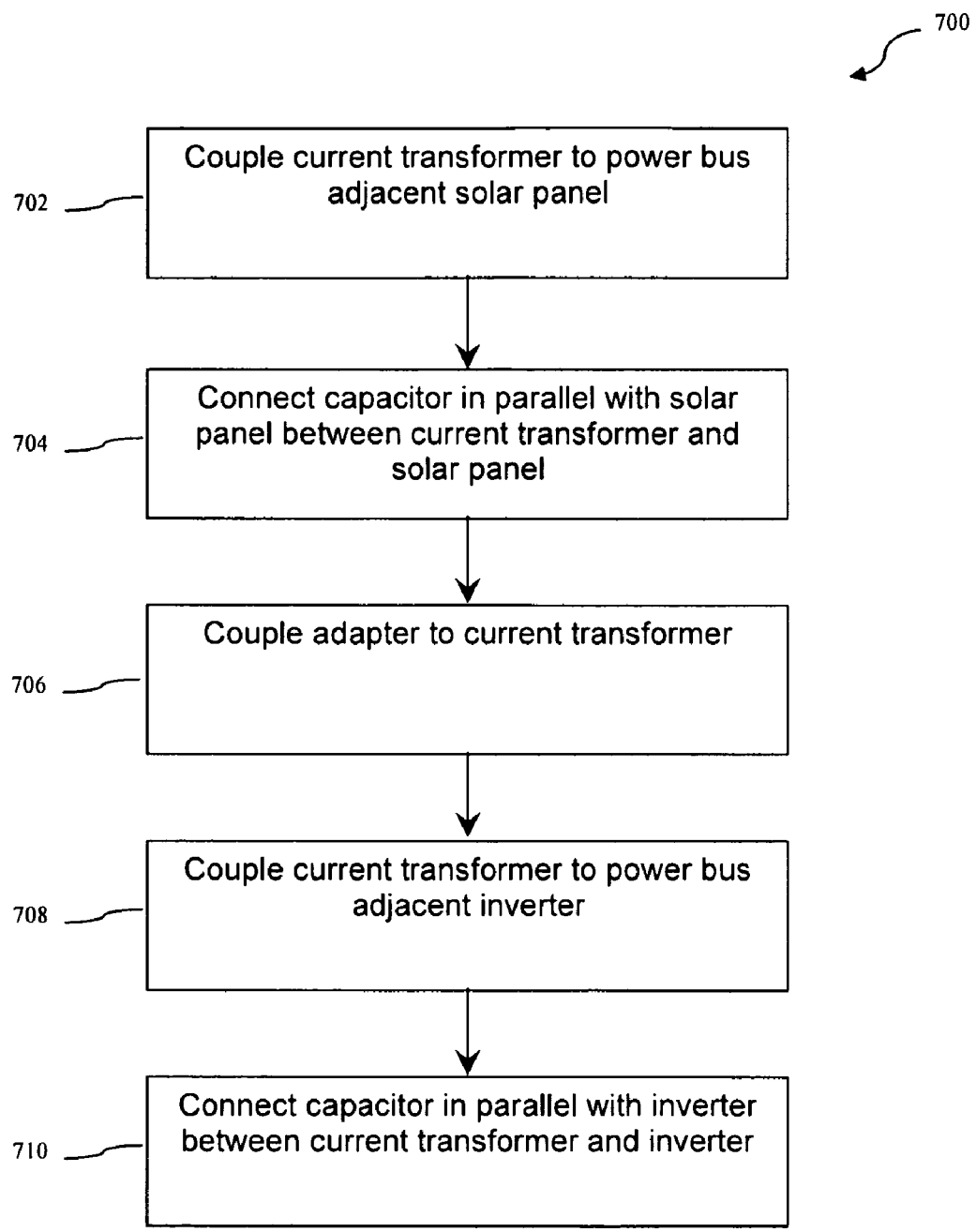
FIG. 6A is an exemplary method in accordance with one embodiment of the present invention.

FIG. 6A is an exemplary method 700 in accordance with one embodiment of the present invention. At a step 702, a current transformer is coupled to a power bus adjacent a solar panel. At step 704, a capacitor is connected in parallel with the solar panel and between the current transformer and the solar panel. At step 706, an adapter is coupled to the current transformer. At step 708, a current transformer is coupled to the power bus adjacent an inverter. At step 710, a capacitor is connected in parallel with the inverter and between the current transformer and the inverter.

While some embodiments have been described, those skilled in the art will appreciate that various other embodiments in accordance with the present invention are also possible. For example, while the above discussion was focused primarily on the DC bus, the present invention can also be applied for a low frequency AC bus. As another example, while the coupling current transformers have been described to include a Rogowski coil, the coupling current transformers of the present invention can include variations of the Rogowski coil and transformers other than the Rogowski coil. As yet another example, while the discussion above sometimes refers to a source and other times refers to a load, the present invention can apply to both sources and loads, as appropriate.

As stated above, several types of products can address the needs of power line communications. One type is narrowband power line communication products. The narrowband power line communication products can be roughly divided into two types: one type involves single or dual carrier tones, while a newer type mostly involves a kind of spread spectrum technique involving a large number of carrier tones or a digitally synthesized equivalent.

The single and dual-tone modem solutions are robust and proven, and can fit most budgets. However, such solutions often are not able to transmit nearly as much data as is needed to scale the number of sensors and sampling frequency as required in an energy generation system with many sensors. Single and dual-tone power line modems can transmit between 1,200 to 4,800 bits per second, and are very inexpensive to implement.

The spread spectrum solutions show even better robustness and a much higher throughput, but can be expected to cost much more than most applications can justify. Spread spectrum power line modems transmit between 32 to 100 kilobits per second by transmitting multiple carrier tones, each modulated with a portion of the payload bit stream. In spread spectrum communications, the input bits are separated into sub-streams along with some amount of redundant data to be used to later recover the data in the event that a portion of it was corrupted. Each sub-stream is modulated onto one of the many carriers, and simultaneously transmitted.

Such a multi-tonal system can be reasonably expected to be more expensive than a single-tone modem by a factor similar to the number of tones employed simultaneously. If the spread spectrum technique is implemented by means of digital signal processing, rather than by employing multiple modems, the cost of the digital signal processing system depends on its computational power. The computational power, in turn, also depends on the bandwidth of the spread spectrum technique, which is roughly equivalent to the number of concurrent carrier tones employed.

Based on the foregoing, the simple modems that are affordable are far too slow, and the fast modems are very expensive. What is needed is a simple yet effective method and system for collection of digital information from a large number of digital sensors over power wiring, avoiding the need for a separate communications network. The methods and systems of the present invention described herein achieve a high rate of data among a very large number of devices on a single power line while keeping the cost low.

In one embodiment, the present invention includes the separate and distinct implementation of slave communication nodes and a master communications node. In contrast to the present invention, existing solutions treat communication nodes as equal, aiming at peer-to-peer communications that mimic a local area network of computers, as described in more detail below in connection with FIG. 7. In accordance with one embodiment of the present invention, a slave node is a digital sensor. In one embodiment of the present invention, a master node is a data collection computer to store and analyze collected data, or the gateway that connects the data collection computer to the power line. Note that on any given network there is one master node, making the implementation cost of the master node relatively insubstantial. At the same time, in one embodiment, the same network could host as many as 500 slave nodes (i.e., sensors) which can be implemented relatively inexpensively, as described in more detail below in connection with FIGS. 8 and 9. In one embodiment, a second master node can be added to the network to provide redundancy.

Figure 7:
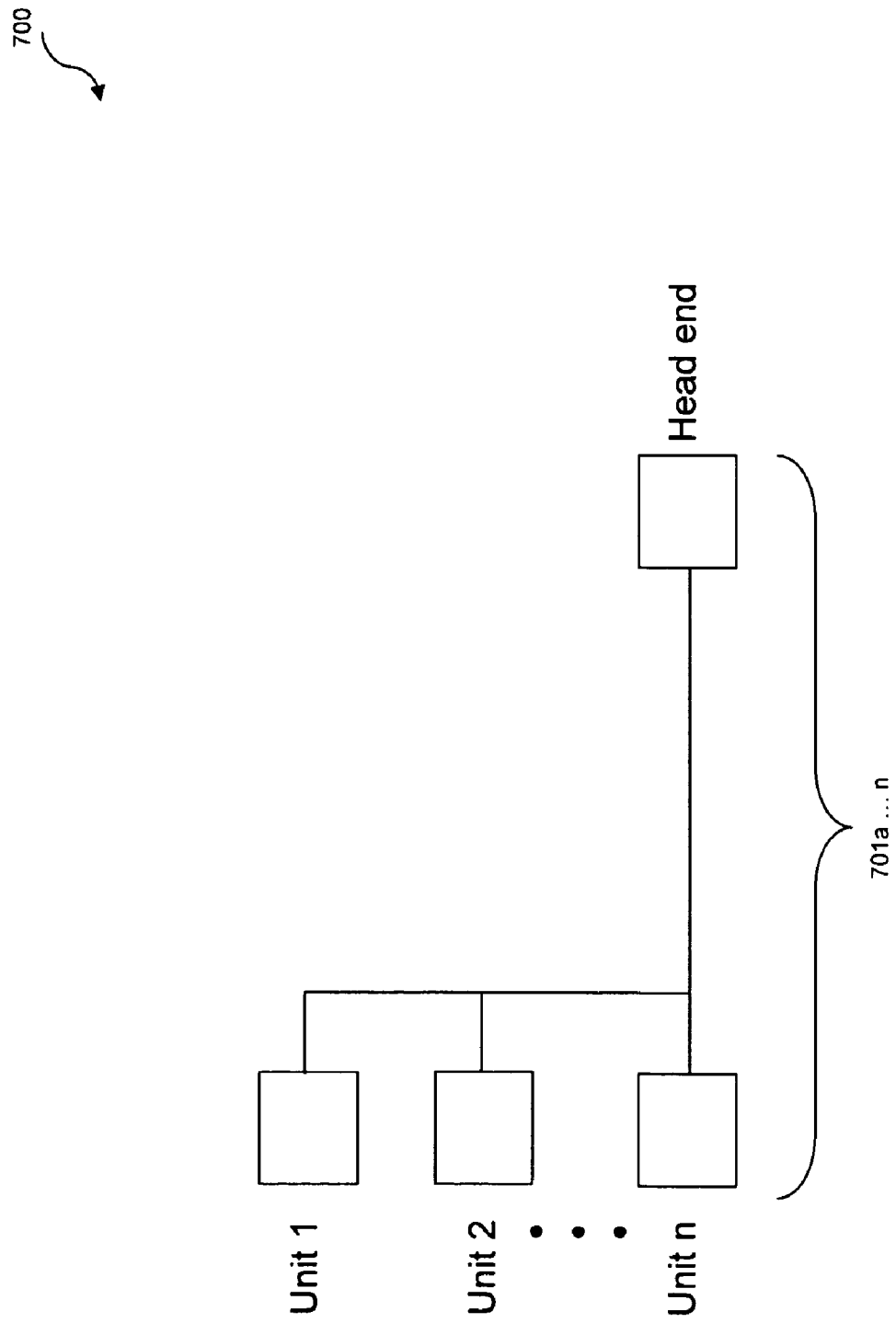
FIG. 7 illustrates a peer-to-peer network.

FIG. 7 shows a peer-to-peer network 700 with modem units 701a-n, including one modem unit at a head end and the Units 1-n in the field. All the units are equal to one another. The units are all of the same type and design. However, the cost per unit is higher because each unit must be designed for and capable of handling all aspects of the desired communication over the peer-to-peer network 700.

Figure 8:
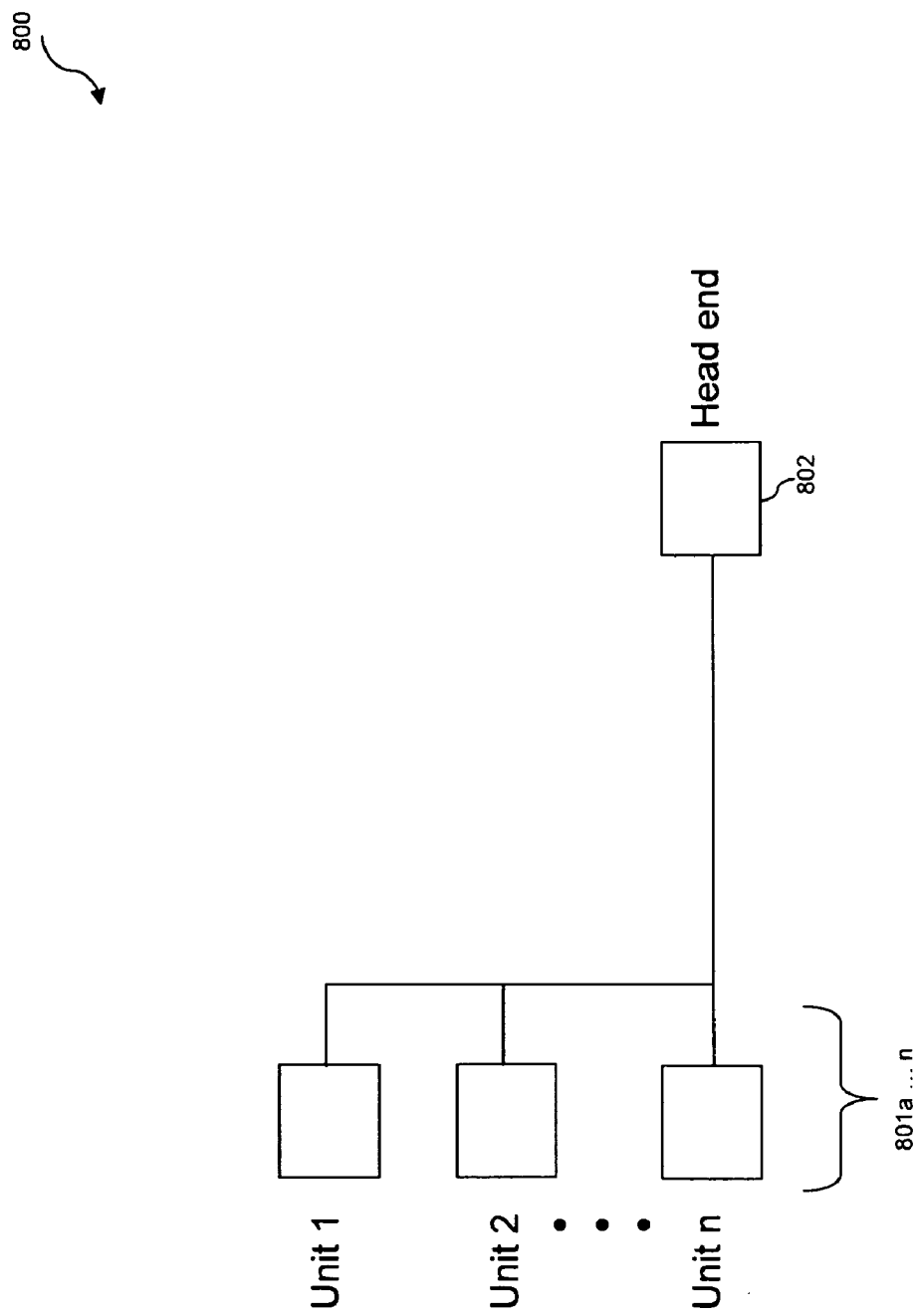
FIG. 8 illustrates a master-slave network in accordance with one embodiment of the present invention.

FIG. 8 shows an asymmetric master-slave network 800 of modem units (or nodes). The modem units include slave modem units 801a-n that have limited capabilities but are extremely inexpensive. A head end modem 802, which serves as a master modem, has many more capabilities than the slave modem unit 801a-n, and thus is more expensive. In one embodiment, the master-slave network 800 requires only one head end modem unit 802. In one embodiment, two head end mode, i.e., master modems, or more can be employed if, for example, a backup is required or if the system is very large in scale.

Figure 9:
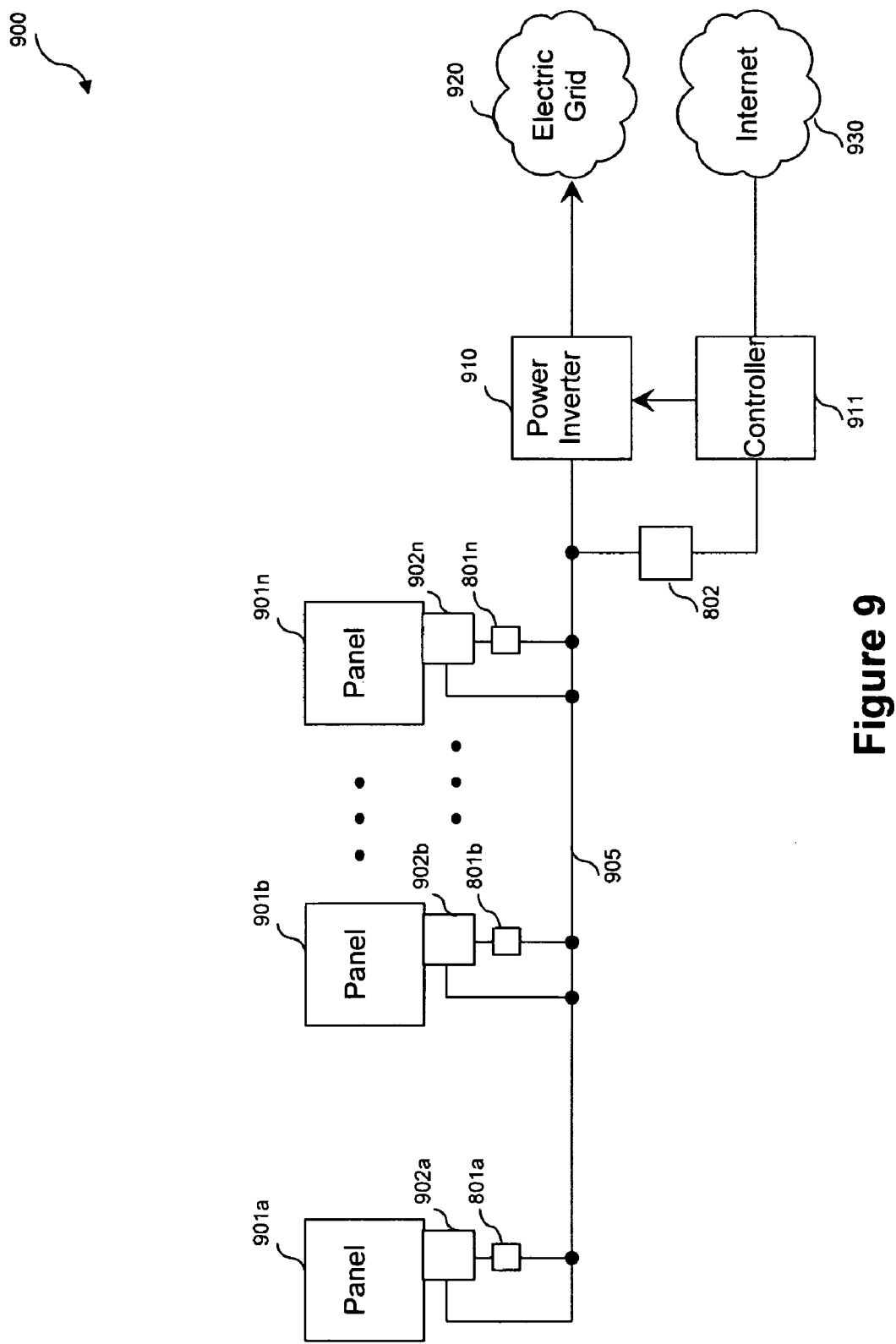
FIG. 9 illustrates a photovoltaic installation system (or energy generation system) in accordance with one embodiment of the present invention.

FIG. 9 shows a photovoltaic installation system (or energy generation system) 900 according to an embodiment of the present invention. Panels 901 a-n are connected with controller (or converters) 902a-n. Each of the converters 902a-n has an associated slave modem unit 801a-n coupled to a power bus 905, as described earlier. Master modem 802 is connected to head end controller 911. The head end (or master) controller 911 controls power inverter 910. The power inverter 910 delivers electric power to the electric grid 920. In one embodiment, the controller 911 has connectivity to Internet 930 in the form of data delivered over power lines. In one embodiment, the controllers can be microcontrollers.

In one embodiment, the present invention employs the spread spectrum principle of transmitting at multiple (orthogonal) frequencies. However, instead of having portions of the same bit stream split to be carried on multiple frequencies, in one embodiment each frequency (channel) carries a different data stream, so that multiple slave modem units can transmit on different channels concurrently. This increases the aggregate throughput on the network by a factor equal to the number of simultaneously active carriers.

Figure 10:
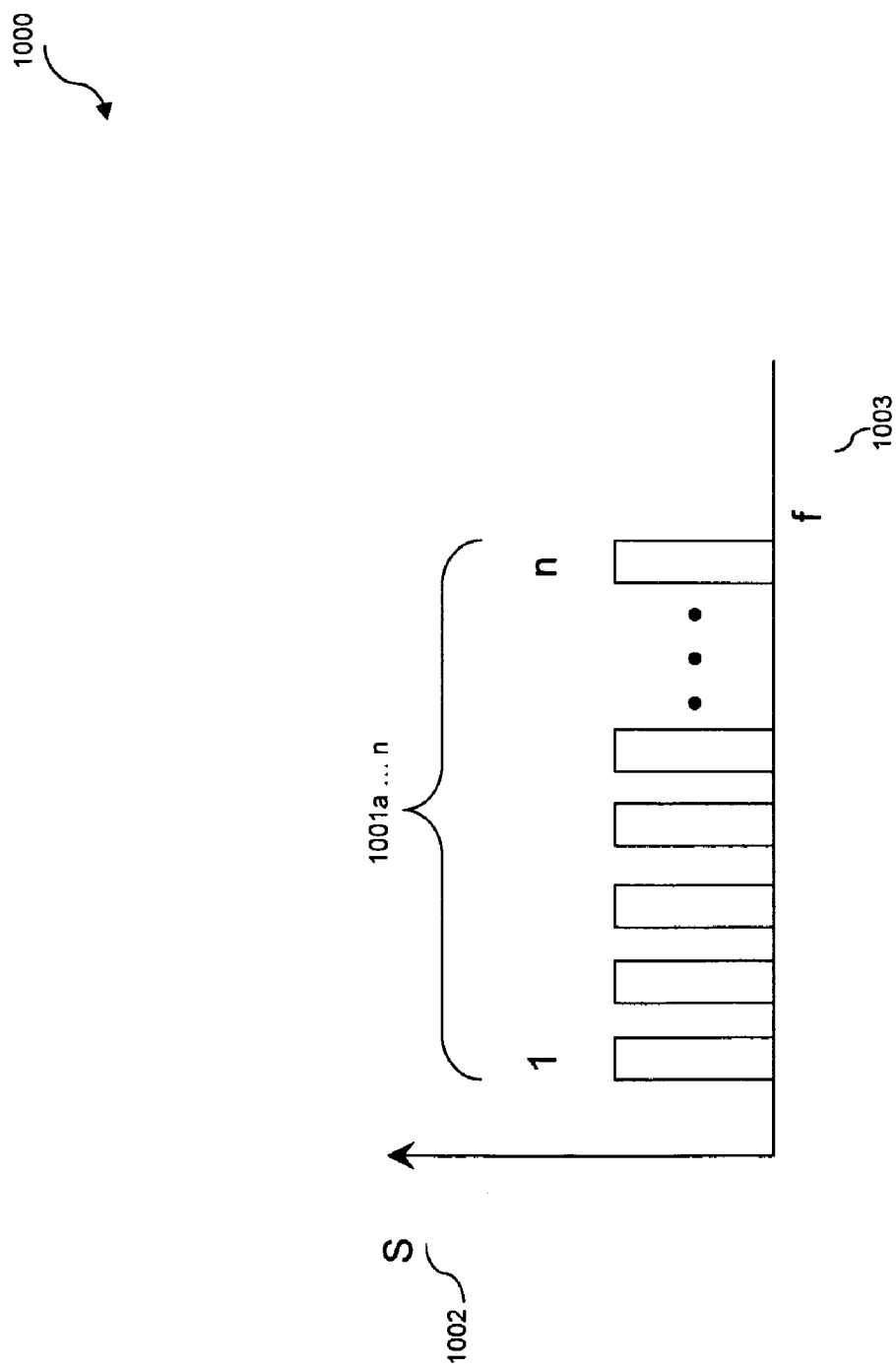
FIG. 10 illustrates a graph of channels of a communication system in accordance with one embodiment of the present invention.

FIG. 10 is a graph 1000 of channels of a communication system according to an embodiment of the present invention. In one embodiment, the communication system can be the energy generation system 900, the energy generation system 600, or other energy generation system. The x-axis represents frequency and the y-axis represents amplitude. As depicted, frequency is represented by f 1003 and amplitude is represented by S 1002. The graph 1000 includes a number of channels 1001 a-n, each operating at a frequency as shown. One or two (or another number) of the channels 1001 a-n may be used as communication channels, for example, channel 1 or channel n. When a slave node is started or when operation of the slave node otherwise initializes, the slave node can listen to one of the communication channels.

The communication channel can act as a type of control channel. Once a slave node establishes communication with the master modem over the control channel, the master modem assigns to the slave node either a channel for exclusive use or a channel shared among two or three (or more) slave nodes. The master modem can communicate on all the channels simultaneously, thus having all the bandwidth required for the communication system, but with each individual slave node having only limited bandwidth access. A second control channel may be used as a backup, in case the primary control channel is unavailable due to, for example, radio frequency interference or some other operational problem.

In one embodiment, each slave node implements a single channel modem unit that can operate on one of a number of channels. The use of a single-tone modem as the slave modem unit maintains affordability. Because the master node must be able to support a number of orthogonal channels concurrently, cost associated with the master modem may be more significant. The increased cost of the master modem is acceptable because there may be only one (or two) master nodes on any given network.

The following is an exemplary implementation according to one embodiment of the present invention. Other implementations and other embodiments of the present invention are also possible in accordance with the present invention.

A slave node can be implemented with a basic sensor. Design of the slave node can be extended with the addition of a single-carrier FSK modem. In one embodiment, an ST Microelectronics ST5470 chip can be used as such a modem. The ST Microelectronics ST5470 chip is very inexpensive, and can be used with a few passive external components to implement power line coupling and filtering. Such components add little cost to the overall cost of power line communications. The ST Microelectronics ST5470 chip supports eight selectable orthogonal channels, and is capable of carrying 4,800 bits per second. In one embodiment, to implement the slave-side of a communications protocol as discussed in more detail below, the microcontroller (or controller) includes a data memory and the use of appropriate software code.

In one embodiment, the master node can be efficiently implemented by, for example, several simple FSK modems. In one embodiment, up to eight ST Microelectronics ST5470 chips can be used that connect to the master node, which serves as the data collection module for solar panel performance. A high throughput microcontroller of the master node can handle all eight modems concurrently, and run the software code required to implement the master side of the communications protocol, as discussed in more detail below. The microcontroller transmits the collected data along with its own diagnostic information to a main processor by means of a fast serial port (e.g., 115 kbps over RS-232). In one embodiment, the main processor is part of the microcontroller. In one embodiment, some of the processing functionality can also be provided by processors in the modems. Each of the eight modems is set to one of the eight channels it can handle. Each modem can receive an 4.8 kbps bit stream, which increases the maximum aggregate throughput of the master node, and thus the entire network, to approximately 38,000 bits per second. It will be appreciated that a portion of the above theoretical maximum throughput will be lost due to intra-frame time gaps allowing one sensor to cease transmission and another sensor to commence. It is also possible that one of the eight channels may not be usable on some networks due to parasitic L/C resonance. Still, even with approximately 20% of throughput lost to the aforementioned phenomena, a master mode in accordance with the present invention can support up to 500 sensors, each transmitting approximately 64 bits (inclusive of protocol overhead) each second.

In one embodiment, to support the type of communications discussed above, a communications protocol coordinates the transmission of sensor data such that the bandwidth available on multiple channels is efficiently utilized. The communications protocol also facilitates automated configuration and identification of the sensors that would be installed in large number for the energy generation system and, as a result, controls installation and maintenance costs.

Figure 11:
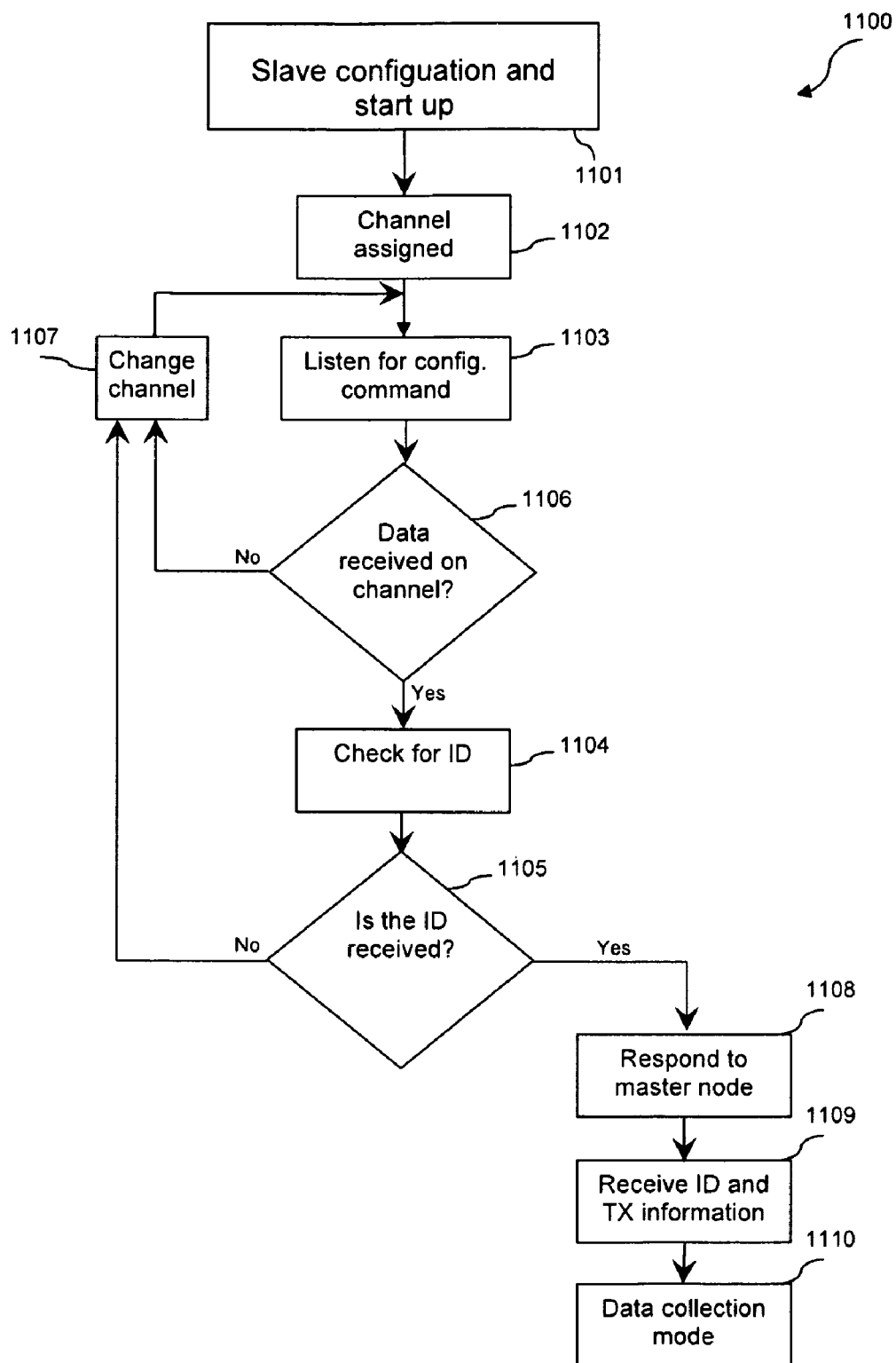
FIG. 11 is an exemplary method of a communications protocol in accordance with one embodiment of the present invention.

FIG. 11 shows an exemplary flow diagram 1100 of a communications protocol from the perspective of a slave node when power is applied to the slave modem unit. In step 1101, all slave nodes enter the configuration and start up mode and all connected slave nodes (sensors) are identified. In step 1102, each slave node is assigned a channel and timing for transmission of data. In step 1103, slave nodes passively listen for configuration commands. In decision block 1106, it is determined whether data is being received on the channel from the master node. If the answer of decision block 1106 is no, the flow proceeds to step 1107, where the slave node changes channels. Because slave nodes change channels, slave nodes are not left out of the network in the event that some channels can not be used effectively. If the answer of decision block 1106 is yes, the flow proceeds to step 1104, where the slave node checks to see if an identification of the slave node (e.g., a hardware identification of the slave modem unit) is received from the master node on the channel. In decision block 1105, it is determined if such an identification has been received by the slave node. If the answer of decision block 1105 is no, the flow proceeds to block 1107. If the answer of decision block 1105 is yes, then the flow proceeds to block 1108. At block 1108, the slave node responds with its identification to the master node.

In step 1109, the master node transmits information regarding configuration and, more specifically, a command to each slave node, assigning the slave nodes with a short identifier that is unique only within the scope of one network and assigning each slave node with a channel where it should transmit its data. The master node also provides an indication of when a particular slave is given permission to transmit, guaranteeing that its transmission does not collide with the transmission of other slave nodes. A communications technique can prevent multiple nodes from responding at the same time on the same channel to a single identification command to avoid corruption of or collision with their responses.

Each slave node switches to a regular data collection mode in step 1110, where it remains until it either loses power or detects a problem with its configuration. When in data collection mode, each slave node passively listens on its channel and begins transmission of information regarding solar panel performance right after it detects a packet originating from another slave node that it has been assigned to follow. The transmission begins only after making sure that the transmission of the other slave node has been completed. Each "revolution" of slave transmissions begins with the master node transmitting a leader packet that may also carry some diagnostic information, including an indication of current time of the master node.

If a slave node has failed to transmit for several minutes, i.e., either it failed to detect the ID of its predecessor or the channel is jammed, it reverts to the configuration and start up mode 1101, as described above. The master node may periodically re-enter the configuration mode for a brief time to optionally detect additional sensors that may have not been powered along with the other sensors which have already run in data collection mode. Any failure of the master node to transmit its diagnostic information for a long period returns all sensors to the configuration mode.

In one embodiment, the sensors are equipped with an LED that is visible during maintenance. This LED should clearly reflect if the slave node is in configuration mode or in data collection mode so that, if for some reason a slave node has failed to communicate with the master node, it can be easily identified and repaired.

A digital sensor in accordance with the present invention, which measures phenomena and solar panel performance, such as electrical power consumption or generation, power quality, and various environmental parameters, can transmit all of its measures in a single packet. A typical sensor packet could contain between 32 to 128 bits of data. In one embodiment, a typical data packet, including protocol overhead (e.g., data header, redundant bits for error detection, etc.) would consist of 64 bits (8 bytes) of data.

In one embodiment, effective capture of most phenomena and information regarding solar panel performance should involve high timing resolution, which means that the above described data packet should be transmitted fairly frequently. For example, electrical power quality issues lasting for just a few seconds are serious enough to cause equipment malfunction, but would not be captured unless the sensor can transmit its data at least once every second. For example, assume that a data collection rate of 1 Hz is required. The foregoing assumptions result in a data rate of 64 bits/sec per sensor or slave node, which is not excessive if the number of slave nodes per network is reasonably small. Certain situations can grow very large and involve up to 500 sensors on a single network, which amounts to the aggregate network throughput of 32,000 bits/sec.

Cost is another key requirement of the target application. To illustrate how crucial is the cost of implementation, the cost of communication over power lines can be compared to the cost of employing an additional set of wires to run a conventional data communications network. The present invention does not entirely rule out the use of dedicated data wires for collection of electrical power measurements. However, the cost of installation and maintenance can be lowered by the use of power lines to transmit data, assuming the cost of adding power line communications capability to every sensor does not exceed the cost of a conventional data network implementation.

In one embodiment, for the present invention to scale further in terms of number of slave nodes and data rate, all that is needed is a modem that can support a larger number of channels that are orthogonal and comply with the relevant regulations and EMI considerations relevant to a given network set up. In one embodiment, further cost reductions may be possible with respect to a sensor by integrating its functionality into a fewer number of components—e.g., if a microcontroller is embedded with an appropriate modem.

With respect to the master node, in one embodiment, numerous discrete modems can be replaced with a DSP to implement a similar communications scheme in software code. The use of such a DSP can support additional modulation schemes that could prove more efficient or robust, and use more orthogonal channels to support slaves nodes that are capable of a larger number of carrier frequencies.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations or steps in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. A system, comprising:
a solar panel having a first terminal and a second terminal to provide electric power;
a power bus coupled to the first terminal and the second terminal of the solar panel to receive the electric power;
a capacitor coupled to the power bus and configured to connect the first terminal of the solar panel to the second terminal of the solar panel to form a loop between the capacitor and the solar panel;
a slave node coupled to the power bus at a location outside the loop between the capacitor and the solar panel and configured to transmit information regarding the solar panel; and
a master node remotely coupled to the slave node over the power bus to receive the information regarding the solar panel from the slave node.

2. The system of claim 1 wherein the slave node includes a first controller and a current transformer, the current transformer coupled to the power bus at the location outside the loop.

3. The system of claim 1 wherein the master node includes a second controller.

4. The system of claim 1 wherein the master node is configured to communicate, using a spread spectrum communications technique, with a plurality of slave nodes concurrently over the power bus.

5. The system of claim 1 wherein the master node is configured to transmit information regarding configuration to the slave node over the power bus.

6. The system of claim 5 wherein the information regarding configuration includes at least one of identification information, channel information, and transmission timing information.

7. The system of claim 1 wherein the slave node includes a single channel modem.

8. The system of claim 1 wherein the master node includes a plurality of single channel modems.

9. The system of claim 1 wherein the master node includes a digital signal processor (DSP).

10. The system of claim 1 wherein the information regarding the solar panel includes at least one of electrical power generation, power quality, and environmental parameters.

11. The system of claim 1 wherein the slave node operates in a configuration mode and a data collection mode.

12. The system of claim 1 wherein the slave node comprises an LED to visibly indicate operation in a configuration mode or a data collection mode.

13. The system of claim 1 further comprising a backup master node.

14. An energy generation system, comprising:
a plurality of solar panels;
a power bus configured to connect electric power outputs from the plurality of solar panels to a load;
a plurality of slave nodes installed on the plurality of solar panels respectively and configured to transmit information regarding the solar panels on which the slave nodes are installed; and
a master node remotely coupled to the plurality of slave nodes over the power bus, the master node configured to control, through the power bus, transmission operations of the slave nodes to receive the information over the power bus regarding the solar panels.

15. The system of claim 14 wherein the master node is configured to control the transmission operations of the slave nodes via transmitting communication configurations to the plurality of slave nodes.

16. The system of claim 15 wherein the communication configurations identify communication channels to be used by the slave nodes.

17. The system of claim 14 wherein each of the plurality of slave nodes includes a single channel modem.

18. The system of claim 14 wherein the master node includes a plurality of single channel modems configured to receive from more than one of the slave nodes over the power bus simultaneously.

19. A method in an energy generation system, comprising:
listening for, on a frequency channel and by a slave node having an associated first modem coupled to a power bus configured to connect a plurality of solar panels to a load, configuration commands from a master node having an associated second modem coupled to the power bus;
periodically changing the frequency channel used by the slave node during the listening for configuration commands until a configuration command having an identification of the slave node is received in the slave node;
receiving by the slave node the configuration command having the identification of the slave node from the master node;
in response to the receiving of the configuration command having the identification of the slave node, transmitting by the slave node the identification of the slave node to the master node; and
subsequent to the transmitting of the identification of the slave node to the master node as a response to the configuration command, receiving in the slave node communications configuration information from the master node.

* * * * *